(No Model.)

M. T. HYNES.
HEATING STOVE AND FURNACE.

No. 305,691. Patented Sept. 23, 1884.

WITNESSES.
W. J. Cambridge
Chas. E. Griffin

INVENTOR.
Michael T. Hynes
per F. E. Taschemacher
Atty.

UNITED STATES PATENT OFFICE.

MICHAEL T. HYNES, OF SOUTH BOSTON, MASSACHUSETTS, ASSIGNOR TO JOHN J. JOHNSTON, OF SAME PLACE.

HEATING STOVE AND FURNACE.

SPECIFICATION forming part of Letters Patent No. 305,691, dated September 23, 1884.

Application filed February 1, 1884. (No model.)

*To all whom it may concern:*

Be it known that I, MICHAEL T. HYNES, a citizen of the United States, residing at South Boston, in the county of Suffolk and State of Massachusetts, have invented certain Improvements in Heating Stoves and Furnaces, of which the following is a full, clear, and exact description, reference being had to the accompanying drawings, making part of this specification, in which—

Figure 1:
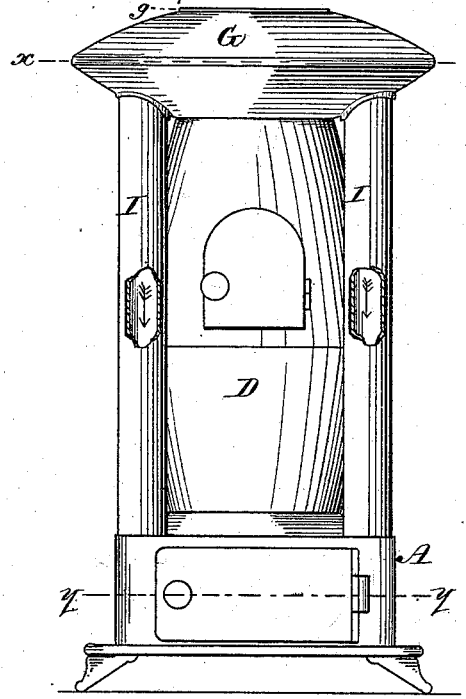
Figure 2:
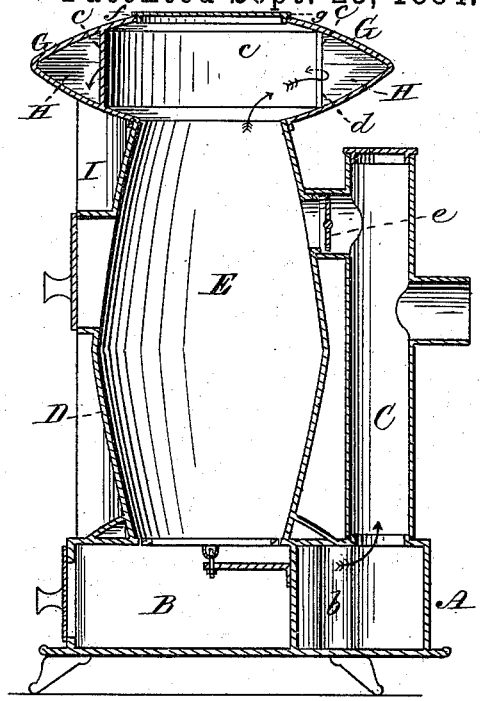
Figure 3:
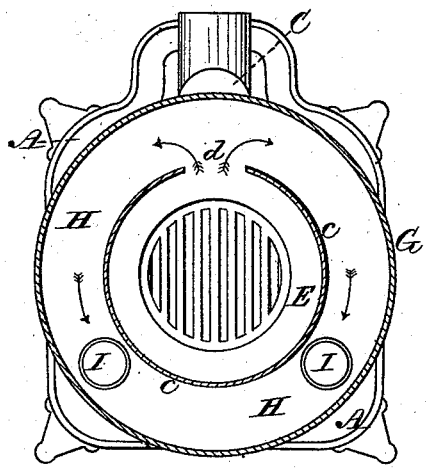
Figure 4:
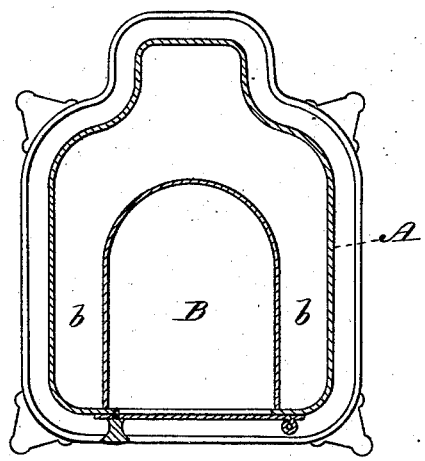

Figure 1 is a front elevation of a heating-stove constructed in accordance with my invention. Fig. 2 is a vertical section through the center of the same. Fig. 3 is a horizontal section on the line $x\ x$ of Fig. 1. Fig. 4 is a horizontal section on the line $y\ y$ of Fig. 1.

My invention relates to certain improvements in heating stoves and furnaces, and has for its object to obtain the maximum amount of heat with the least possible consumption of fuel.

To this end my invention consists in a stove or furnace provided above the combustion-chamber with a top or enlargement having a flue or flues extending around its outer edge and communicating with the combustion-chamber through a suitable aperture, in combination with means for conducting the heated air and gases from the top flue or flues at a point opposite to that at which they entered the same down to the flue or flues in the base or lower portion of the stove, which communicates with the chimney-flue, whereby a large area of radiating-surface at the top of the stove is caused to become intensely and rapidly heated, while waste of heat is avoided, and a material saving in fuel thereby effected.

In the said drawings, A represents the base of a heating-stove, in which is formed the ash-pit B, the walls of which on each side are made double, forming flues or passages $b\ b$, which communicate with the vertical pipe C, leading to the chimney.

D is the body of the stove, within which is formed the combustion-chamber E, and surmounting the body D is an enlarged top or chamber, G, placed immediately above and communicating with the combustion-chamber E. Within this chamber G is placed a vertical circular partition, $c$, forming an annular flue, H, extending entirely around the outer edge or portion of the top or chamber G, the partition $c$ being provided at the rear with an opening, $d$, through which (when the damper $e$, leading from the combustion-chamber to the vertical pipe C, is closed) the hot air and products of combustion pass into the flue H, from the front portion of which they are conducted into two descending flues or pipes, I I, and thence, as indicated by the arrows, Fig. 1, down into the flues $b\ b$ of the base A, and around the latter to the ascending pipe C, up which they pass to the chimney.

At the center of the top G is an opening, $f$, provided with a removable cover, $g$. This opening may be used for the reception of a kettle, if desired, and also affords convenient access to the chamber and to the flue H, in case it should be desired to free the latter from any obstruction; but this opening may be dispensed with, if desired. By thus providing a stove or furnace above the combustion-chamber with an enlarged top having an extended area of radiating-surface, and providing said top with a flue extending around its outer edge, communicating at one portion with the combustion-chamber and at its opposite portion with means for conducting the heated air and gases down into the flues of the hollow base, it will be seen that the hot air and products of combustion are compelled at first, before becoming cooled, to pass entirely around the hollow top of the stove, thus intensely and rapidly heating the latter before passing down into the lower portion of the stove, while the descending pipes I I, which are arranged in front of the body D, also afford a large area of heating-surface, and by this construction the heat is utilized to such an extent that in practice but little is allowed to pass to waste, thus enabling me to economize the fuel to the greatest possible extent, reduce the waste or loss of heat to a minimum, and greatly increase the heating capabilities of the stove. When the fire is first started the damper $e$ is opened and the smoke allowed to pass directly into the chimney instead of into the flue H.

The top or chimney, G, instead of being of circular form, as shown, may be of oval, rectangular, or other form, as preferred.

I am aware of the United States Letters Patent granted to J. and E. Backus, February 18, 1841, and also of the reissue Letters Patent granted to Wm. A. Barlow January 1, 1867, No. 2,436, and lay no claim to the construction therein shown and described, my improved stove differing from those described in the aforesaid patents in having an annular flue arranged within its enlarged top separated from the combustion-chamber by a partition, whereby the hot air and products of combustion are caused to pass entirely around the hollow top of the stove near its outer edge or periphery, thus rapidly heating the same.

What I claim as my invention, and desire to secure by Letters Patent, is—

1. A heating stove or furnace provided above its combustion-chamber with a top or enlargement having a vertical partition, $c$, and a flue or flues extending around its outer edge or portion and communicating with the combustion-chamber, and separated therefrom by said partition $c$, except at the inlet-opening, in combination with means for conducting the heated air or gases from the top flue or flues to the hollow base or lower portion of the stove, and thence to the chimney, substantially as and for the purpose set forth.

2. In a heating stove or furnace, the body D, surmounted by a top or enlargement, G, provided with a flue or flues extending around its outer edge or portion, and communicating with the combustion-chamber E through an inlet-opening, $d$, in combination with the descending pipes or flues I I, leading from that portion of the flue H opposite to the inlet-opening $d$ down into the hollow base A, substantially as described.

3. In a heating stove or furnace, the body D, having a top or enlarged chamber, G, located immediately above the combustion-chamber E, and communicating directly therewith, and provided with a partition, $c$, and a flue, H, extending around its outer edge or portion, and communicating at or near the rear of the stove with the combustion-chamber by means of an inlet-opening, $d$, in combination with the descending pipes I I, arranged in front of and on either side of the body D, and extending from the front portion of the flue H down to the front portions of the flues $b\ b$ of the base A, all constructed to operate substantially in the manner and for the purpose set forth.

Witness my hand this 28th day of January, A. D. 1884.

MICHAEL T. HYNES.

In presence of—
P. E. TESCHEMACHER,
W. J. CAMBRIDGE.